US008885493B2

(12) United States Patent
Sundaram et al.

(10) Patent No.: US 8,885,493 B2
(45) Date of Patent: Nov. 11, 2014

(54) USE OF TEST PACKETS BY PACKET SWITCHES IN COMPUTER NETWORKS

(71) Applicants: Shivakumar Sundaram, Chennai (IN); Krishnamurthy Subramanian, Mountain View, CA (US); Pathangi Narasimhan Janardhanan, Chennai (IN); Balaji Venkat Venkataswami, Chennai (IN)

(72) Inventors: Shivakumar Sundaram, Chennai (IN); Krishnamurthy Subramanian, Mountain View, CA (US); Pathangi Narasimhan Janardhanan, Chennai (IN); Balaji Venkat Venkataswami, Chennai (IN)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 13/662,338

(22) Filed: Oct. 26, 2012

(65) Prior Publication Data
US 2014/0119203 A1     May 1, 2014

(51) Int. Cl.
*H04J 1/16* (2006.01)
(52) U.S. Cl.
USPC ............ 370/250; 370/235; 370/252; 370/401
(58) Field of Classification Search
CPC . H04L 12/26; H04L 12/2678; H04L 12/2686; H04L 12/2689; H04L 12/2692; H04L 12/2694; H04L 12/2697
USPC .................................. 370/241–252, 352, 401
See application file for complete search history.

(56) References Cited

U.S. PATENT DOCUMENTS

| 7,310,356 | B2 * | 12/2007 | Abdo et al. ................... 370/522 |
| 8,014,278 | B1 | 9/2011 | Subramanian et al. |
| 8,145,136 | B1 | 3/2012 | Bharghavan |
| 2011/0283013 | A1 | 11/2011 | Grosser et al. |
| 2012/0039335 | A1 | 2/2012 | Subramanian et al. |
| 2012/0087372 | A1 | 4/2012 | Narasimhan |
| 2014/0029449 | A1 * | 1/2014 | Xu et al. ...................... 370/252 |

OTHER PUBLICATIONS http://www.force10etworks.com/CSPortal120/TechTips/0005_ECMP-LAG-FAQ.aspx, Equal Cost Multipath and Link Aggregation FAQs in the E-Series, 1 pg total, no later than Aug. 10, 2012.
Overview of the MGX RPM-XF, Cisco MGX Route Processor Module (RPM-XF) Installation and Configuration Guide, Release 5.2, Part No. OL-6594-01, Rev. CO, Sep. 2005.
http://humairahmed.com/blog/?p=2354, How to Stack Dell Force10 S60 Switches, 5 pages, no later than Sep. 11, 2012.

(Continued)

*Primary Examiner* — Kan Yuen
(74) *Attorney, Agent, or Firm* — Haynes and Boone, LLP (57) ABSTRACT

A packet switch receives a management packet sent for discovery on a data flow's path through a network. The switch creates a test packet (310T) which looks like a packet belonging to the data flow of interest. The test packet is processed by the switch like the data flow of interest except that the test packet is not necessarily transmitted. The processing results may include the egress ports for the test packet, and if the ports are part of a LAG or ECMP group, the results provide the group and the group members associated with the egress ports. Firewall actions and other information can be included. The switch may forward the results to the originator of the management packet. The switch may insert the results into the management packet and forward the management packet on the ports determined as egress ports for the test packet. Other features are also provided.

25 Claims, 7 Drawing Sheets

(56) References Cited

OTHER PUBLICATIONS

Removing and Installing Route Processor Modules (RPMs), Catalog No. LC-ED-RPM, 3 pages, no later than Sep. 4, 2012.
Broadcom BCM56640 Extensible Multilayer Ethernet Switch for Chassis Applications, Product Brief, Extensible 1/10/40/100-GBE Multilayer Ethernet Switch, 2 pgs, Nov. 12, 2010.
Broadcom BCM56540 Premier Metro Ethernet Switch, High Bandwidth 1 GBE/10 GBE/40 GBE Multilayer Ethernet Switch, Apr. 28, 2011.
Algorithms for Packet Classification, Pankaj Gupta et al., 29 pages, Computer Systems Laboratory, Stanford University, Stanford, CA 94305-9030, no later than Sep. 4, 2012.
http://www.ietf.org/id/draft-janapath-opsawg-flowoam-req-00.txt, Requirements for OAM tools that enable flow Analysis draft-janapath-opsawg-flowoam-req-00, 11 pgs, May 8, 2012.
The Dell Force10 ExaScale E-Series, A Dell Technical White Paper, Sep. 2011, 10 pages, Sep. 2011.
https://www.force10networks.com/CSPortal20/TechTips/0014_SNMP-HowtoGetDynamicMACCamEntries.aspx, How to Get Dynamic CAM Entries (CAM Table) for the E-Series Using SNMP, 3 pgs, no later than Aug. 10, 2012.
Requirements for OAM Tools That Enable Flow Analysis draft-janapath-opsawg-flowoam-req-00, May 8, 2012, 11 pages.
http://en.wikipedia.org/wiki/IPv4, Internet Protocol version 4 (IPv4), 13 pages, no later than Aug. 10, 2012.
Fujitsu Ethernet Tutorial, Apr. 11, 2006, Issue 3, 42 pages, Apr. 11, 2006.
White Paper, Link Aggregation According to IEEE 802.3ad, SysKonnect, v1.00 Apr. 4, 2002, 21 pages.
http://www.cisco.com/en/US/tech/tk648/tk362/technologies_tech_note09186a0080157626.shtml, Understanding Table Index Values in SNMP, Doc ID: 40700, 4 pgs, no late than Aug. 8, 2012.
MPLS Concepts, Drawbacks of Traditional IP Routing, Implementing Cisco MPLS (MPLS) v2.1, 60 pages Copyright 2002.
Simple Network Management Protocol, http://en.wikipedia.org/wiki/Snmp, 10 pages, no later than Aug. 8, 2012.
htttps://www.force10networks.com/CSPortal20/TechTips/0052_HowDoICreateAPortChannel.aspx, How Do I Use SFTOS to Create a Port Channel (LAG)? 3 pages, no longer Aug. 10, 2012.
http://tools.ietf.org/html/draft-janapath-intarea-traceflow-00, Traceflow draft-janapath-intarea-traceflow-00.txt, Jan. 23, 2012, 43 pages.
Cisco-Using the Extended ping and Extended tracerout Commands, http://kbase/paws/servlet/ViewFile/13730/ext_ping_trace.xml?convertPaths=1[Mar. 16, 2010 8:51:55 AM], 11 pages total, Mar. 16, 2012.
Definitions of Managed Objects for Remote Ping, Traceroute, and Lookup Operations, J. Quittek and K. White, Jun. 2006, 89 pages total.
FTOS Configuration Guide FTOS 8.4.2.6, E-Series TeraScale. C-Series, S-Series (S50/S25), Dell Force10, Nov. 2011, pp. 1 thru 440.
FTOS Configuration Guide FTOS 8.4.2.6, E-Series TeraScale. C-Series, S-Series (S50/S25), Dell Force10, Nov. 2011, pp. 441-880.
FTOS Configuration Guide FTOS 8.4.2.6, E-Series TeraScale, C-Series, S-Series (S50/S25), Dell Force10, Nov. 2011, pp. 881 thru 1312.
R. Ramjee et al., "Separating Control Software From Routers," 10 pages, no later than Sep. 24, 2012.
T.V. Lakshman et al., "The SoftRouter Architecture," 6 pages, no later than Sep. 24, 2012.

* cited by examiner

L4 Payload 330P

Injection header 930.R

| | Classification results details from pre-filtering at step Rx1 1210 | L2 stage look up results. EGRESS_PORT, LAG information and index into it 1220 | L3 stage look up results. EGRESS_PORT, ECMP information like ECMP GROUP ID and and index into it 1230 |
|---|---|---|---|
| Ingress filtering (Ingress ACL, policer, etc.) results 1240 | Conflict / errors in ACL rules 1250 | Egress ACL, policer, etc. results 1260 | Errors in pipeline stages 1270 |

USE OF TEST PACKETS BY PACKET SWITCHES IN COMPUTER NETWORKS

BACKGROUND OF THE INVENTION

The present invention relates to information handling systems (IHSs) that include packet switches, i.e. network routers and other devices that receive and forward data in computer networks. A packet switch forwards data on links or ports that are determined based on information in the data. Some embodiments of the invention are useful for testing of data flows through such information handling systems and the networks.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. IHSs may include a variety of hardware and software components that may be configured to process, store, and communicate information and may include one or more computer systems, data storage systems, and networking systems, such as a packet switch.

Testing and diagnostics of a data flow in a computer network can be complex because packet switches have many components and may be handling diverse types of data traffic: it can be difficult to isolate a faulty component or the type of data that cause the error. Improved testing techniques are therefore desirable.

SUMMARY

This section summarizes some features of the invention. Other features may be described in the subsequent sections. The invention is defined by the appended claims, which are incorporated into this section by reference.

Some embodiments of the present invention are suitable for testing and diagnostics of routers, layer-2 switches, and other packet switches, as well as of network links and data flows. Some embodiments use packet injection techniques described below. Some embodiments were motivated by the need to improve the existing tools, such as Ping and Traceroute, used in network Operations and Management (OAM) for troubleshooting and for performance and network planning. The efforts to develop such tools have lead to development of a Traceflow protocol described in the following documents published by the Internet Engineering Task Force (IETF) and incorporated herein by reference:

Pathangi Narasimhan Janardhanan et al., "Requirements for OAM tools that enable flow analysis", OPSAWG Working Group, INTERNET-DRAFT, Proposed Standard, May 8, 2012, available on World Wide Web at http://www.ietf.org/id/draft-janapath-opsawg-flowoam-req-00.txt.

Pathangi Narasimhan Janardhanan et al., "Traceflow", Intarea Working Group, Internet Draft, Proposed Standard, 23 Jan. 2012, available on World Wide Web at http://www.ietf.org/html/draft-janapath-intarea-traceflow-00.txt.

These two documents are co-authored by some of the inventors and by other parties. To the extent that these documents may describe packet injection techniques of the present invention, these techniques were invented only by the named inventors of this disclosure.

Figure 1:
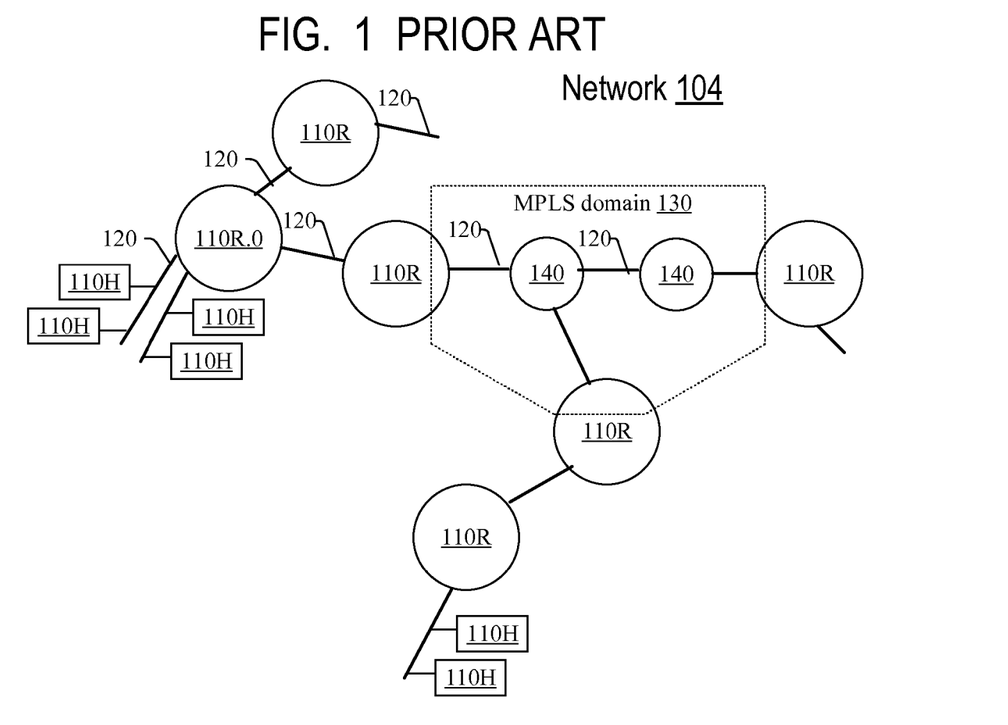
FIGS. 1, 2, and 3 are block diagrams of networks according to prior art.

FIG. 1 illustrates an exemplary IP network 104 with nodes 110 (including routers and other packet switches 110R and 110R.0, and end-point hosts 110H) interconnected by links 120. The traditional OAM tools Ping and Traceroute can be used to check the end-to-end connectivity between two nodes 110, to determine the routers 110 in the path between the two nodes, and to isolate a malfunctioning link; see "Using the Extended ping and Extended traceroute Commands", Cisco Systems, Inc., 2010, Tech nodes, available at http://www.cisco.com/en/US/tech/tk365/technologies_tech_note09186 a0080093f22.shtm 1, incorporated herein by reference.

Figure 2:
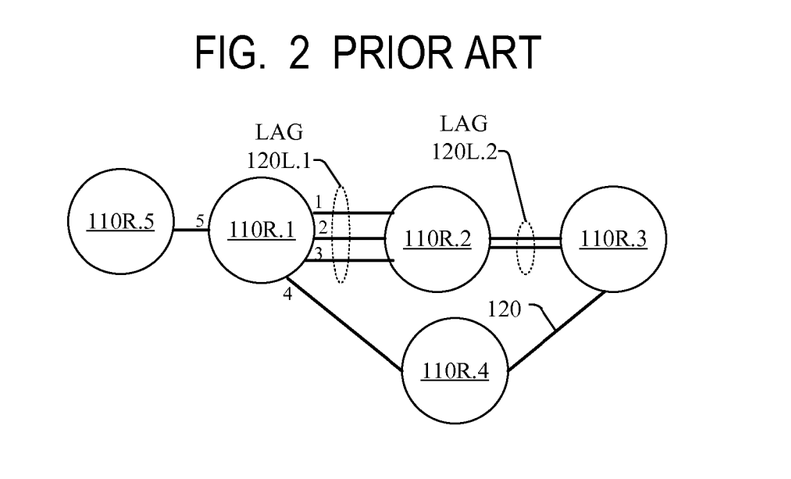

The Ping and Traceroute commands are inadequate to trace traffic flow in complex, heterogeneous networks, such as those including non-IP domains 130 with non-IP switches 140, e.g. MPLS (Multi-Protocol Label Switching) domains, if the point of failure should be isolated to a link or switch in such a domain. (MPLS is described, for example, in "MPLS Concepts", Cisco Systems, Inc., 2002, incorporated herein by reference). Further, many networks use multiple path configurations to improve bandwidth and redundancy. These multipaths may have the form of end-to-end ECMP (Equal Cost MultiPath routing) or LAGs (Link Aggregation Groups). See e.g. U.S. Pre-grant Publication no. 2011/0283013 A1 (Nov. 17, 2011) of patent application Ser. No. 12/786,152 filed by Grosser et al.; U.S. Pre-grant Publication no. 2012/0087372 A1 (Apr. 12, 2012) of patent application Ser. No. 12/900,435 filed by Narasimhan; and U.S. Pat. No. 8,014,278 issued Sep. 6, 2011 to Subramanian et al., which are incorporated herein by reference. The LAGs and ECMPs are illustrated in FIG. 2 for a small IP network of five routers 110R.1-110R.5. Router 110R.1 has 5 ports, labeled 1 through 5. Ports 1, 2, 3 are connected by respective three links 120 to router 110R.2. The three links are grouped into a LAG 120L.1. Router 110R.2 is similarly connected to router 110R.3 by two links 120 grouped into a LAG 120.L2. Two other links 120 connect respective ports 4 and 5 of router 110R.1 to ports of routers 110R.4 and 110R.5. Still another link 120 connects router 110R.4 to router 110R.3.

A packet received at router 110R.1 from router 110R.5 can reach router 110R.3 through any one of two communication paths: through router 110R.2 or, alternatively, router 110R.4. These two communication paths may have equal costs as established by the routers in execution of a routing algorithm. The communication paths and the costs are represented by routing tables (not shown) stored on the routers. Therefore, if the packet must be forwarded to router 110R.3, then router 110R.1 selects an egress port by selecting one of the two paths, and if the selected path is through router 110R.2, then router 110R.1 selects one of the three ports 1, 2, 3 corresponding to LAG 120.L1.

Figure 3:
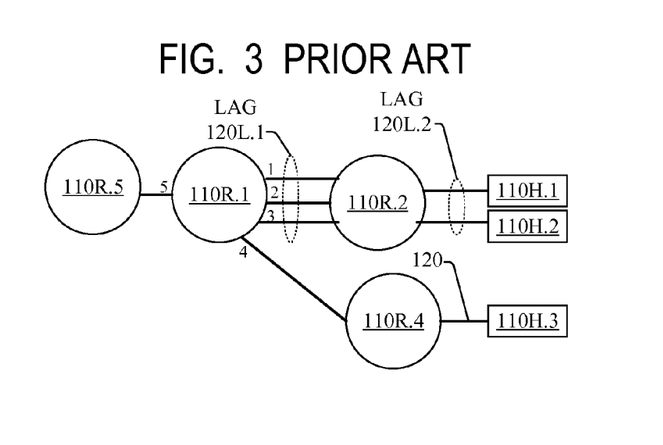

ECMPs and LAGs can be used to balance the load between redundant servers as illustrated in FIG. 3. This figure is similar to FIG. 2, but router 110R.3 is replaced by three end stations 110H.1, 110H.2, 110H.3 connected to respective links 120. These stations can, for example, be redundant servers responding to service-request packets.

Figure 4:
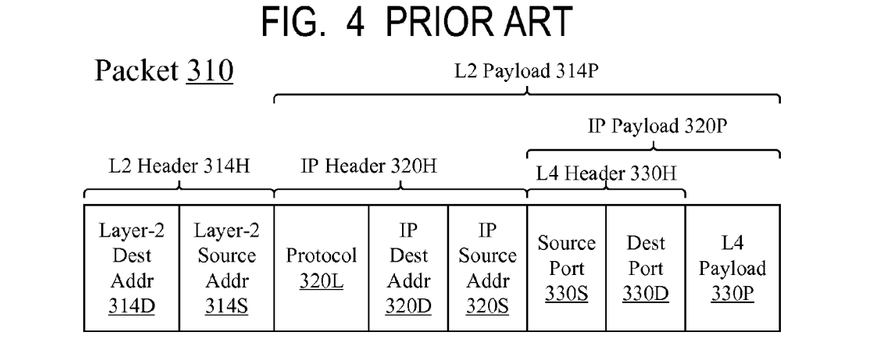
FIG. 4 is a block diagram of an exemplary layer-2 packet according to prior art.

The egress port selection at router 110R.1 can be performed in many ways to achieve the desired load balancing over the different links that are members of ECMPs and LAGs and over different servers 110H. In some examples, the egress port is selected by hashing the packet's address and other fields. FIG. 4 shows some fields of a typical layer-2 packet 310 containing a layer-2 header 314H and layer-2 payload 314P. Assuming that the packet arrived at router 110R.1 from router 110R.5, the packet's layer-2 source and destination addresses 314S and 314D in header 314H may specify the layer-2 addresses of the corresponding ports of routers 110R.5 and 110R.1 respectively. The remaining fields shown are part of the layer-2 payload 314P, which is an IP packet in this example. The IP packet 314P includes IP header 320H which includes a protocol number field 320L indicating the layer 4 protocol, e.g. UDP, TCP, ICMP, etc. The IP header 320H also includes source and destination IP addresses 320S and 320D. In addition to the IP header, IP packet 314P includes IP payload 320P formed according to the protocol number 320L. In this example, the IP payload is a TCP or UDP packet, which includes a header 330H with source and destination ports 330S and 330D. The IP payload also includes layer-4 payload 330P.

In determining the ECMP member path or LAG member link for forwarding such a packet, the router 110R.1 may hash the source and destination IP addresses (fields 320S, 320D) and the protocol 320L, and possibly the source and destination ports 330S, 330D if the packet 310 is a UDP or TCP packet. If the packet 310 is formed by a Ping or Traceroute command, the packet's source and destination IP addresses 320S, 320D are defined by the end points of the data flow being tested ("actual data flow" below). However, in many implementations, the Ping and Traceroute packets use the ICMP protocol rather than UDP or TCP. In such implementations, the Ping or Traceroute packet will not necessarily be forwarded on the same link 120 as the actual data flow if the actual data flow uses a UDP or TCP protocol and the link 120 is determined using the UDP or TCP port numbers 330S, 330D. This is just one illustration of a common problem: the Ping or Traceroute packets are not necessarily forwarded on the same link 120 as the data flow desired to be tested. Also, it may be desirable to collect more information about the data flow's path than Ping or Traceroute provide.

Figure 5:
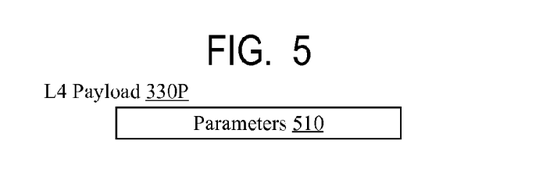
FIG. 5 is a block diagram of a portion of a packet's payload used for network management.

This problem is addressed by the Traceflow protocol. When a Traceflow request packet 310 is sent from a source node 110 to a destination node, the Traceflow packet 310 carries information on the actual data flow desired to be tested. The Traceflow packet itself is a UDP packet with a predefined UDP destination port number 330D. However, the Traceflow packet's UDP payload 330P contains parameters 510 (FIG. 5) defining the data flow to be tested. For example, the parameters 510 may include a hypothetical layer-2 or layer-3 packet on the data flow to be tested. Parameters 510 may specify any protocol for the data flow to be tested, e.g. TCP, UDP, ICMP, or any other protocol handled by a router 110 or switch 140 in the data flow path. Parameters 510 may specify any desired port numbers for a TCP or UDP data flow. The routers 110 or switches 140 use the parameters 510 to determine, for example, the ECMP member path or LAG member link on which the actual data flow would be forwarded. The routers or switches can then forward the Traceflow packet 310 on such link or links on which the actual data flow would be forwarded. The routers or switches can also identify such ECMP or LAG members to a network manager, and enable the network manager to isolate faults to such ECMP or LAG members.

Some embodiments of the present invention provide routers and other packet switches that can process the Traceflow packets in an efficient manner. However, the invention is not limited to Traceflow.

According to some embodiments, when a packet switch (e.g. 110 or 140) receives a management packet 310 (e.g. Traceflow request packet), the packet switch may form another packet—"test packet"—labeled 310T in some subsequent figures. The test packet 310T is formed based on the management packet 310, e.g. based on parameters 510 of management packet 310, to represent a packet from the actual data flow. The test packet 310T is then injected into the packet switch's normal processing module (such as 620 in FIG. 6), i.e. the module that would be used for processing the actual data flow. This module determines on which port or ports (i.e. which link or links 120) the test packet 310T should be forwarded, or whether or not the test packet is to be discarded, or determines other information of interest. This information of interest can then be sent to a suitable node, e.g. to the network manager's node (e.g. the originator of the management packet 310), or possibly other node specified by the management packet 310 (e.g. by parameters 510), or the information can be displayed at the packet switch, or processed in any desired way. In some embodiments, the information of interest is inserted into the payload of the management packet 310, and the management packet 310 is forwarded on the port or ports determined for the test packet 310T. In some embodiments, when the management packet 310 reaches the end point of the data flow to be tested, if the information of interest was inserted into the management packet's payload at one or more packet switches, then a response packet can be formed by the end point node to carry all or any part of this information of interest to the network manager's node or any suitable node. In another example, if the normal processing in any packet switch determines that the test packet is to be discarded, then the management packet 310 may be forwarded to the data flow's end point on any suitable link or links 120, or may be not forwarded; the information of interest, including the information that the test packet is to be discarded, can be sent to the network manager or any suitable node.

Other embodiments are also possible. For example, the test packet itself can be forwarded to the management node. The invention is not limited to the features and advantages described above except as defined by the appended claims.

DESCRIPTION OF SOME EMBODIMENTS

The embodiments described in this section illustrate but do not limit the invention. The invention is defined by the appended claims.

Figure 6:
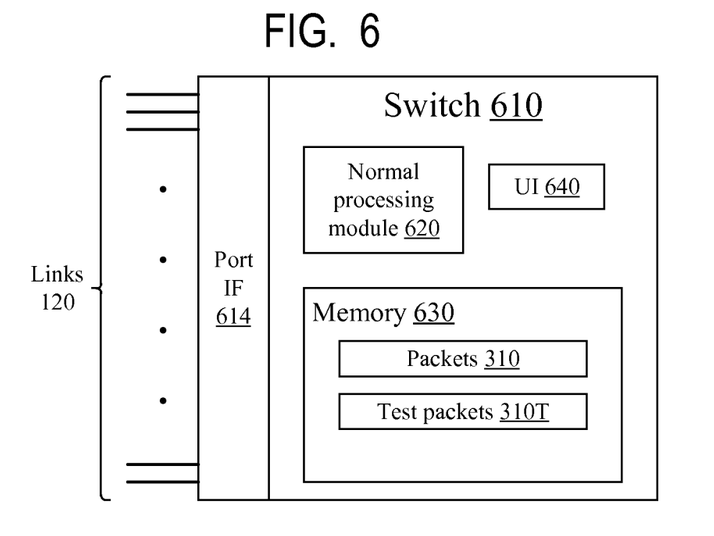
FIG. 6 is a block diagram of a packet switch according to some embodiments of the present invention.

FIG. 6 illustrates an exemplary packet switch 610 according to some embodiments of the present invention. Packet switch 610 can perform the function of a router 110 or switch 140 of FIG. 1, or can perform other functions, e.g. MPLS switching, ATM switching, layer-2 (e.g. Ethernet) switching, and possibly other functions. Packet switch 610 includes ports 614 (shown as "port interface") that are connected to links 120. A link 120 can connect the switch 610 to another such switch, or to a router 110 or switch 140 of some other type, or to end station 110H, or to multiple routers, switches, and other types of network nodes, possibly to a LAN or WAN of multiple nodes. Each port 614 can be a separate physical port, but it can be a sub-port, e.g. a part of the total bandwidth of a physical port. A link 120 may also represent the whole or a part of the total bandwidth of a physical link. A physical link can be a wire or wireless link. A link 120 may also represent a LAN or other network. Ports 614 are described below as full duplex ports (capable of both transmitting and receiving), but any number of ports 614 can be half-duplex ports.

In addition to ports 614, switch 610 includes a "normal" processing module 620 which determines how the incoming packets 310 are to be handled: forwarded, discarded, or in some other way. In some embodiments, processing module 620 performs the same processing operations as in prior art switches or routers, but the invention is not limited to such processing operations. If a received packet 310 is to be forwarded, then processing module 620 determines the one or more ports 614 ("egress ports") on which the packet is to be forwarded. For example, in some embodiments, if packet 310 is an IP packet, the egress ports can be determined based on the IP destination address 320D, or IP source address 320S, or IP payload 320P, or based on the ingress port 614 on which the packet was received, or other information, or combination of the above, as known in the art.

Packet switch 610 includes a memory 630 for holding packets 310, test packets 310T, and possibly other information. Packets 310 and 310T in memory 630 could be layer-2 packets (as in FIG. 4 for example), or they could be layer-3 packets (such as when the layer-2 encapsulation is discarded when the packets are received), or may include some other parts of any layers, and different packets may have different formats. In fact, different ports 614 may receive or transmit information according to different protocols, based on data at any layer, with different formats for the corresponding packets 310 as received or transmitted or stored in memory 610. For example, some embodiments perform name-based forwarding, where a packet that carries a request for some content is forwarded based on the content name rather than the address of the host containing the content. See Matteo Varvello et al., "Caesar: a Content Router for High Speed Forwarding", ICN'12, Aug. 17, 2012, Helsinki, Finland, ACM, incorporated herein by reference. The invention is not limited to any layering, and in particular is not limited to the Open Systems Interconnection (OSI) model.

Switch 610 may (or may not) include a user interface module 640, possibly including a keyboard, a mouse, a display, a printer, and/or other devices, or possibly just a few blinking LEDs (light emitting diodes), as known in the art.

Figure 7:
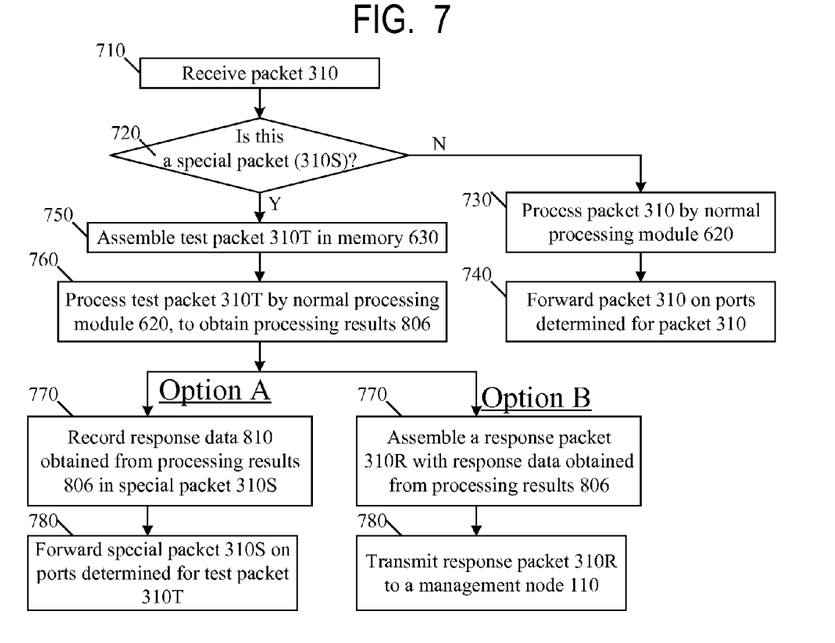
FIG. 7 is a flow chart of operations of a packet switch according to some embodiments of the present invention.

FIG. 7 is a flowchart of some packet processing operations performed by switch 610. At step 710, the switch receives a packet 310 and stores the packet in memory 630. Switch 610 may append any desired information to the received packets. Examples of such information are described below with respect to FIGS. 11 and 12. At step 720, the switch determines if the received packet 310 is a special packet, i.e. a management packet of a predefined type for which a test packet is to be created (such as for some Traceflow request packets). The special packets are sometimes labeled as "310S" below. For example, in a Traceflow embodiment, a special packet 310S is a UDP packet in which: (i) the UDP destination port 330D indicates Traceflow, and (ii) parameters 510 indicate a Traceflow request for which a test packet is to be created (the packet switch 610 does not necessarily use a test packet for any Traceflow request, and different switches 610 may differ in when a test packet is created). If the received packet is not a special packet, then at step 730 the packet is processed by normal processing module 620. For example, the normal processing may indicate that the packet is to be forwarded, or discarded, or handled in some other way. If for example the packet 310 is to be forwarded, then it is forwarded at step 740 on the one or more ports 614 determined at step 730. Other types of processing can also be used.

Figure 8:
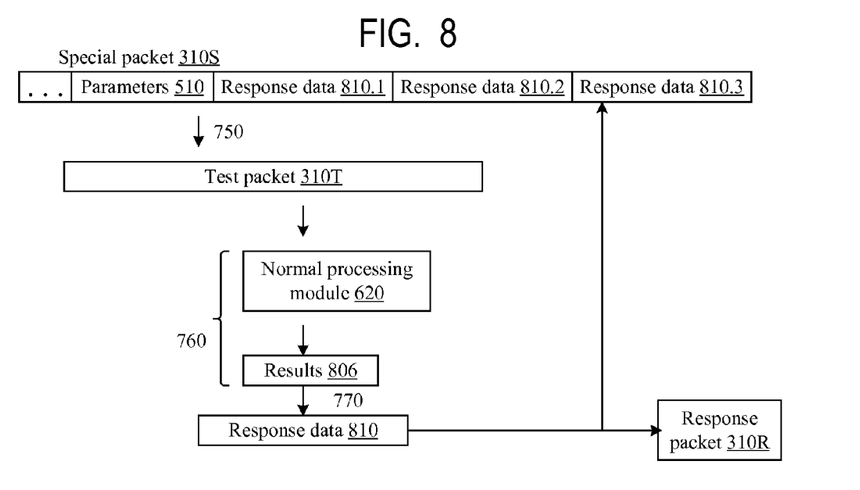
FIG. 8 illustrates a flow of data in a packet switch according to some embodiments of the present invention.

If step 720 determines that the received packet 310 is a special packet (310S), then (step 750) a test packet 310T is created by switch 610 in memory 630. This is illustrated by the diagram of FIG. 8. Then at step 760 the normal processing module 620 processes the test packet 310T as if the test packet was received on a port 614. The test packet 310T can be any packet as defined by the received special packet 310S.

For example, in some embodiments, the test packet is processed as if received on the same port 614 as the special packet 310S. Further, in some IP embodiments, the test packet 310T receives the same layer-2 addresses 314S, 314D and the same IP source and destination addresses 320S, 320D as the special packet 310S, but the remaining fields of the test packet 310T can be any fields defined by parameters 510 stored in the payload 330P (FIG. 5) of special packet 310S. In other embodiments, the test packet's layer-2 and/or layer-3 addresses, and perhaps the entire layer-2 and/or layer-3 headers, and even higher-layer fields, can be specified by parameters 510. In some embodiments, parameters 510 provide the entire test packet, and step 750 merely involves extracting the test packet from the special packet's payload. Test packet 310T can be assembled using any other information, as defined by the received special packet 310S or by some other rules, and the test packet 310T can be a non-IP packet. The received special packet 310S can also be a non-IP packet as the invention is not limited to IP.

At step 760, the test packet 310T is processed by normal processing module 620. The results of this processing are shown at 806 in FIG. 8. The normal processing module 620 may perform the same kind of processing as for non-test packets (for the actual data flow), but may also perform other operations specifically for test packets.

The processing results 806 can be handled in many ways, possibly dependent on parameters 510. FIG. 7 illustrates two possible options A and B. In both options, at step 770, the processing results 806 (FIG. 8) of step 760 are used to obtain data 810. The response data 810 can be obtained in any way specified by parameters 510 and/or other parts of packet 310S and/or other data in packet switch 610, and the response data can include any or all of the information provided by results 806. In Option A, the response data 810 are recorded in the payload of the received special packet 310S as shown at 810.3 in FIG. 8. In the example of FIG. 8, the special packet 310S already includes response data 810.2, 810.2 previously obtained at other switches 610 (not shown) along the path of the special packet 310S. If the results 810 indicate forwarding the test packet 310T, then the special packet 310S is forwarded (at step 780 of Option A) on the one or more ports as determined for the test packet 310T at step 760.

Alternatively (Option B), or in addition, at step 770, the response data are written into a new packet 310R ("response packet"), and at step 780 the response packet is sent to a management node 110 (e.g. to the originator of special packet 310S as determined by the special packet's source IP address 320S, or to some other management node, e.g. as specified by parameters 510). In some embodiments, Option B is used if the processing results 806 indicate that the test packet 310T is to be discarded. The processing results 806, and the corresponding response data 810, may also indicate the reasons why the test packet 310T was to be discarded (e.g. the test packet may have been blocked by a firewall (not shown), such as can be implemented by Access Control Lists (ACLs) or in some other way, in module 620, or the test packet could exceed the size of the maximum transmission unit (MTU) on the links on which the test packet was to be forwarded, or the maximum memory allocated for a corresponding receive or transmit queue or some other data was exceeded, or the module 620 ran out of memory or some other resource, or other reasons may apply). The response packet 310R may also be used if the packet switch 610 is the end point of the data flow being tested (as indicated by the IP destination address 320D for example).

Alternatively, or in addition, the results 806 and/or the response data 810 can be displayed by user interface 640. The results processing can be any processing predefined for the packet switch and/or defined by the special packet 310S. For example, in some embodiments, the response packet 310R is formed and forwarded to a predefined network management node 110 and, in addition, the special packet 310S is forwarded on the ports determined for the test packet 310T (as in Option A at step 780); the response data 810 may or may not be inserted into the special packet 310S. Other processing can also be used.

The results 806 and response data 810 may include any information of interest, e.g. the identification of each link 120 on which the test packet would be forwarded, the identification of a LAG and the LAG member link on which the test packet would be forwarded, the identification of the ECMP and the ECMP member path on which the test packet would be forwarded, the pertinent hash values (which may serve as indices in the LAG or ECMP tables, not shown, or could incorporate information in addition to hash values), and/or any information that could be provided in response to an SNMP request (SNMP stands for Simple Network Management Protocol), and/or other information of interest.

Figure 9:
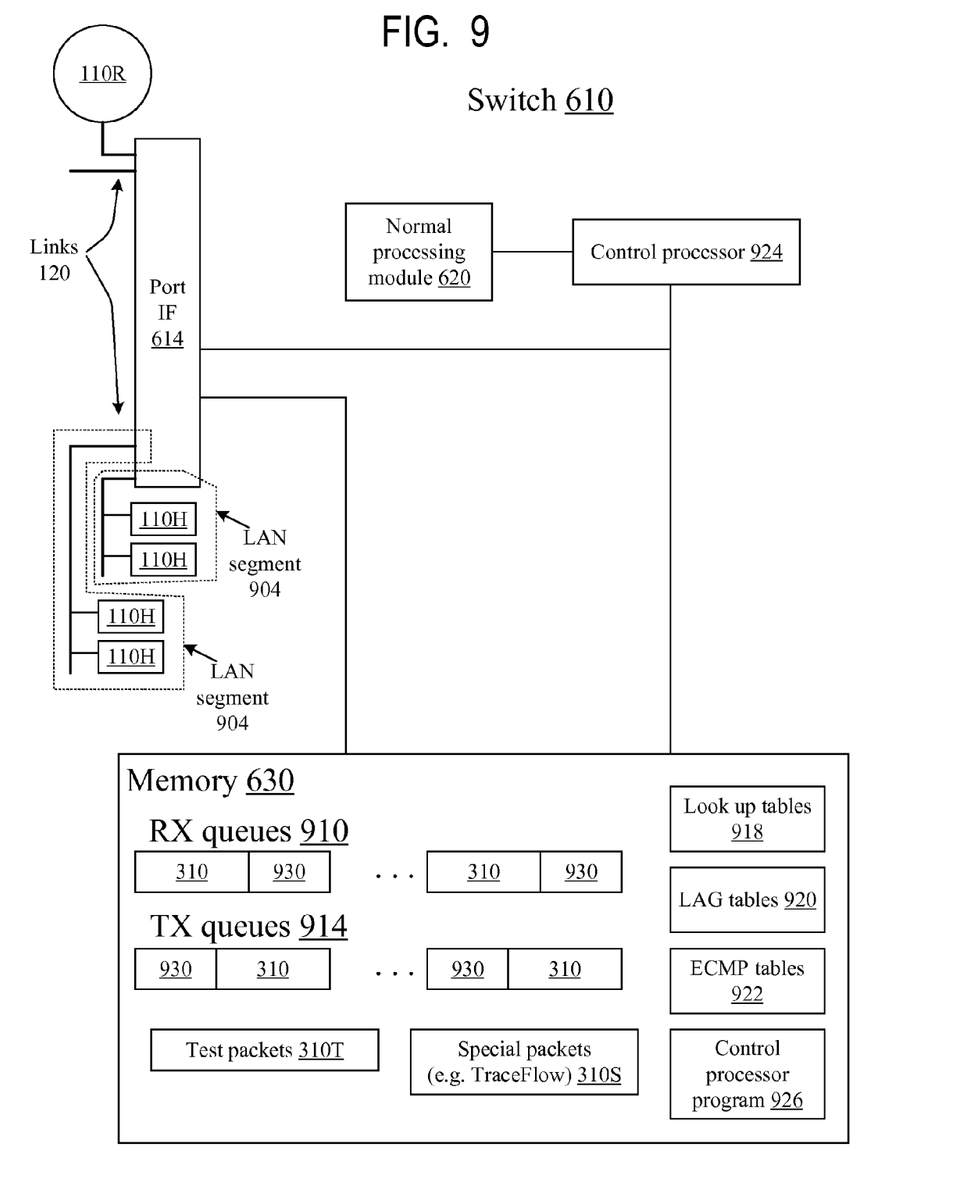
FIG. 9 is a block diagram of a packet switch according to some embodiments of the present invention.

FIG. 9 is a block diagram of a packet switch 610 which could extend the functionality of an existing switch or router, e.g. Broadcom Ethernet switch of type 56640 described in "Broadcom BCM56640 Extensible Multilayer Ethernet Switch for Chassis Applications", Product Brief, Broadcom Corporation, Nov. 12, 2010, incorporated herein by reference. Switch 610 can be used as an edge router 110R.0 (FIG. 1) that connects a number of Ethernet LAN segments 904 (FIG. 9) to the Internet. Switch 610 also performs layer-2 switching for traffic between the Ethernet segments. Switch 610 can be assembled on a single line card or multiple line cards; see e.g. U.S. Pre-grant patent publication no. 2012/0039335 A1 (Feb. 16, 2012) of U.S. patent application Ser. No. 12/856,342 by Subramanian et al., incorporated herein by reference. Switch 610 can also have stacked architecture, with multiple switches interconnected to function as a single switch; soft-router architecture (see e.g. U.S. pre-grant patent publication no. 2006/0092975 (May 4, 2006) of U.S. patent application Ser. No. 11/147,665 by Ansari et al., incorporated herein by reference), and possibly other types of architecture.

In FIG. 9, ports 614 provide an interface between links 120 and memory 630. The memory includes received packet queues 910, transmit packet queues 914, test packets 310T, and special packets 310S. In some embodiments, the packets 310T, 310S are part of the receive and transmit queues 910 and 914 and are not stored separately. In some embodiments, each packet in queues 910 and 914 is supplied with suitable parameters 930 as described below.

Memory 630 also contains various databases, such as look-up tables 918 for determining the ports 614 on which the packets must be forwarded, and possibly determining other information needed for packet processing (e.g. QoS information). The databases may include LAG tables 920 (which identify the LAGs and LAG members for each LAG) and ECMP tables 922 (which identify ECMPs and ECMP members for each ECMP).

Switch 610 can handle many tasks, including for example the tasks specified for Broadcom BCM56640 described above. These tasks include handling of MPLS, VPLS (Virtual Private LAN Service), MPLS-TP (MPLS Transport Service), VLAN (Virtual LAN) translation, and other services. In particular, for VLAN or tunneling support, a packet from an Ethernet segment 904 can be encapsulated by switch 610 into an IP packet, i.e. can be inserted into an IP payload 320P (FIG. 4) of a new IP packet, which is then transferred over the Internet to another segment of the same VLAN. The invention is not limited to the Ethernet, the Internet, or edge routers.

Control processor 924 sets up processing parameters in normal processing module 620 and port interface 614, and handles various control functions. In some embodiments, control processor 924 includes one or more software-programmed computer processors (software 926 can be stored in memory 630 for example); normal processing module 620 and port interface 614 can be hardwired circuits with registers whose contents are written by processor 924 to define the operations performed. The invention is not limited to software programmability of any circuitry or lack of such programmability.

In FIG. 9, memory 630 is a conceptual representation of different memories, including possibly shift registers and other memory structures in port interface 914, and registers and memory in control processor or processors 924. Thus, memory 630 may include pieces which are part of port interface 914, control processor 924, normal processing module 620, and possibly other circuits (not shown), and memory 630 may include pieces located on different line cards, but for convenience memory 630 is shown as a separate block. Each of control processor 924 and port interface 614 may also represent portions of any circuits, including possibly portions located on different line cards. Control processor 924 and port interface 914 are defined herein by their functions, not by location of any circuitry, and they may share some circuitry.

Packet switch 610 may perform many services described above. In an exemplary processing pipeline, packet switch 610 performs the steps denoted below as Rx1 through Rx4 and Tx1 through Tx5. This steps are performed on a received packet 310. Steps Rx1 through Rx4 correspond to ingress, and steps Tx1 to Tx5 correspond to egress.

Rx1:
This step is performed by port interface 614, and includes:
Parsing to identify various fields in the packet so that the fields can be conveniently passed to other steps. Validity checks can be performed at this stage, for example whether or not the layer-2 or layer-3 source address is legitimate for the port on which the packet was received.
Tunnel termination: if the packet 310 was tunneled, the tunneling layers are stripped.
Pre-filtering. This step may perform packet classification (identifying the packet's data flow) using various rules as known in the art. Packet classification may then be used to provide the desired Quality of Service (QoS), security restrictions, and possibly other functionality. The classification rules may include rules according to the present invention to help identify special packets 310S.

Rx2:

Look-up of tables 918 based on the packet fields, e.g. layer-2 and/or layer-3 addresses, packet protocol (e.g. 320L), the VLAN tag (not shown, in layer-2 header), and possibly other fields. The table entry or entries fetched from tables 918 should identify the egress port or ports for the packet, the applicable LAG or ECMP group if there are any, and the LAG or ECMP members corresponding to the egress ports. The table entries can also specify that the packet should be provided to control processor 924 for some processing. This step is performed by normal processing module 620.

Rx3:

Ingress filtering. This may include Ingress ACL (Access Control List) related processing to determine if the packet is to be blocked from transmission on any one or more of the egress ports. The ACL rules may be based on the packet's addresses (e.g. source addresses) and/or other information in the packet, on the port on which the packet was received, and on the table entry or entries fetched at step Rx2. The pertinent ACL rules that cause the packet to be blocked, and any conflicts between the rules, may be identified at this step. Step RX3 is performed by normal processing module 620.

Rx4:

If needed, move the packet from receive queue 910 to a proper memory section or sections, possibly on another line card or line cards, for transmission on corresponding egress ports and possibly other processing. This can be done by a memory management unit (not shown) in normal processing module 620. Or send the packet to control processor 924. This step is performed by normal processing module 620.

If the packet is to be transmitted, then the following steps are performed when the packet has been moved to the proper memory section or sections.

Tx1:

Parsing to identify various fields that will be used in egress processing. This step is performed by normal processing module 620.

Tx2:

Packet modification. This step may provide new layer-2 addresses for the packet transmission. If network address translation is to be performed, the IP addresses are changed at this step. Other packet modification is also possible. This step is performed by normal processing module 620.

Tx3:

Egress ACL (access control list) processing to determine if the packet is to be blocked. For example, the packet may be blocked based on its egress port and/or destination address. This step is performed by normal processing module 620.

Tx4:

Place the packet into transmit queue 914 for transmission on a port or ports 614. This step is performed by normal processing module 620.

TX5:

Transmit the packet by port interface 614.

The switch 610 can detect a special packet 310S (step 720 of FIG. 7) at any suitable stage or stages. For example, in some Traceflow embodiments, part of the special packet detection is performed at stage Rx1 (pre-filtering), where the port interface 614 checks for the UDP destination port number reserved for Traceflow. If a packet 310 is a UDP packet with such a destination port number, then the packet is transferred to control processor 924 at stage Rx4, and the control processor checks whether or not the packet is a Traceflow request packet for which a test packet 310T needs to be created. If so, then control processor 924 assembles the test packet 310T (step 750) and queues the test packet in the appropriate receive queue 910. If not, control processor 924 performs other processing as needed. For example, if the packet 310 does not need a test packet but needs a response packet, the control processor 924 creates a response packet and injects the response packet to the appropriate stage for processing, e.g. queues the response packet into a queue 924 for transmission. If for example the packet 310 is a Traceflow response packet, then the control processor 924 may simply return the packet 310 to queue 910 for normal forwarding.

At step Tx4, port interface 614 checks for the test packets. (The test packets can be identified for example as described below with respect to FIG. 10 steps 750 and 1050). If a test packet 310T is detected, port interface 614 passes the test packet 310T (or the packet pointer) to control processor 924. If for example Option A of FIG. 7 is to be performed, then control processor 924 obtains response data 810 from results 806, inserts the response data 810 into the corresponding special packet 310S (step 770), and queues the special packet in the appropriate queues 914. In the case of Option B, control processor 924 assembles the response packet 310R at step 770, and queues the response packet 310R in the appropriate queue 914. If the test packet itself is not to be transmitted, then control processor 924 may remove the test packet from its transmit queue 914.

At step 780 of Option A or B, the special packet 310S or response packet 310R (or both) are transmitted by port interface 614. Other options can be performed by control processor 924 and/or other parts of the switch 610 as appropriate.

Figure 10:
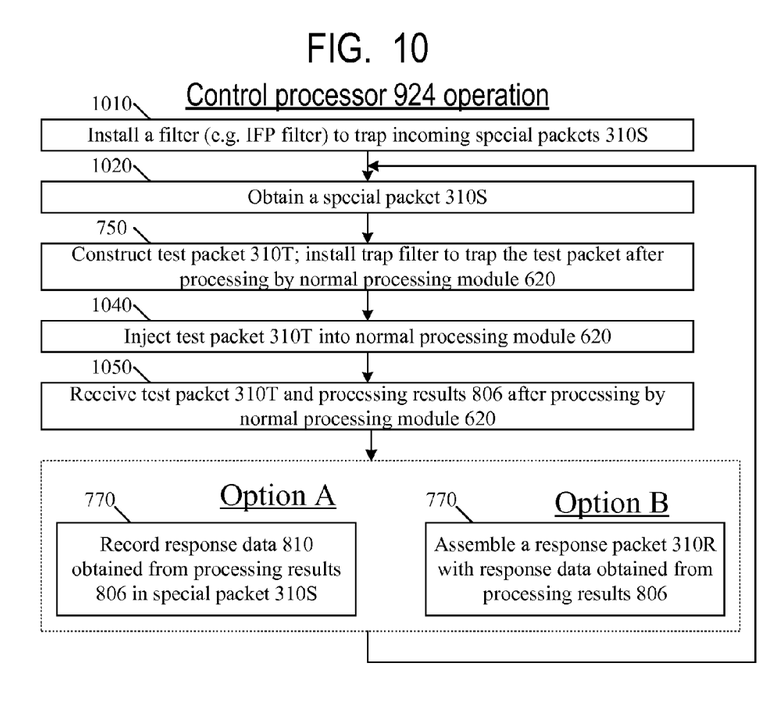
FIG. 10 is a flow chart of operations of a control processor of a packet switch according to some embodiments of the present invention.

FIG. 10 shows an exemplary embodiment of operations performed by control processor 924 as related to test packets. At step 1010, control processor 924 installs a filter to trap possible special packets 310S upon receipt. The filter can be installed on port interface 614 and/or normal processing module 620. For example, in Traceflow embodiments, the filter can be installed according to IFP (Internet Filtering Protocol) to trap UDP packets whose UDP destination port 330D indicates the Traceflow value. In any case, the trap will allow the switch 610 to perform at least part of step 720 of FIG. 7.

At step 1020, when a packet 310 is trapped, the control processor 924 receives the packet (e.g., control processor 924 may receive a pointer to the packet as the packet is stored in its receive queue 910), and control processor 924 does the remaining checking, if needed, to ensure that this is a special packet (i.e. a packet for which a test packet will be needed).

At step 750, control processor 924 constructs a corresponding test packet 310T as described above in connection with FIG. 7. Also, control processor 924 installs a trap filter to trap the test packet 310T after processing by normal processing module 620, e.g. before, during, or after the stage Tx4.

At step 1040, control processor 924 provides the test packet 310T to normal processing module 620. This can be done, for example, by queuing the test packet in the appropriate receive queue 910. Control processor 924 may or may not dequeue the special packet 310 itself.

At step 1050, control processor 924 receives the test packet 310T and the processing results 810 from normal processing module 620. Control processor 924 receives the test packet and the results due to the trap installed at step 750. For example, control processor 924 may receive the pointer to the test packet 310T. The test packet may or may not have been queued in a transmit queue 914 by the normal processing module 620.

Control processor 924 then arranges for processing the results. FIG. 10 illustrates the processing performed for Options A and B of FIG. 7, but other processing is possible as indicated above. In either Option A or B, control processor 924 performs step 770 of FIG. 7, and queues the special packet 310S or the response packet 310R in an appropriate transmit queue 914 for transmission by port interface 614.

Once the receive packets trap is installed at step 1010, the step 1020 and the subsequent steps are performed for each trapped packet in some embodiments.

As indicated above in connection with FIG. 9, in some embodiments each packet 310 in receive and transmit queues 910, 914 is supplied with parameters 930 used to process the packet by switch 610. When a packet 310 is provided to control processor 924, the parameters 930 are attached to the packet with information on the packet as described below. When control processor 924 creates a test packet 310T (at step 1040 for example), the control processor may also create the parameters 930 for the test packet. The parameters 930 are provided to normal processing module 620. This can be accomplished, for example, by queuing the test packet and the parameters 930 in a receive queue 910.

Figure 11:
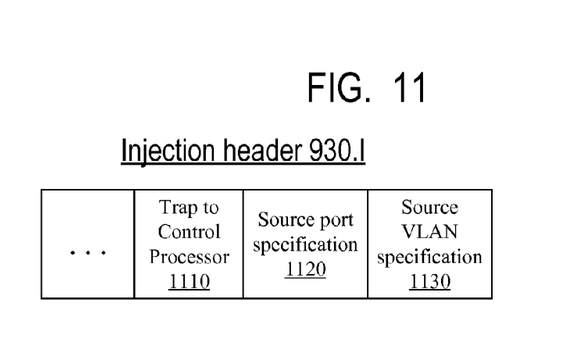
FIGS. 11 and 12 illustrate data structures used in packet switches according to some embodiments of the present invention.
Figure 12:
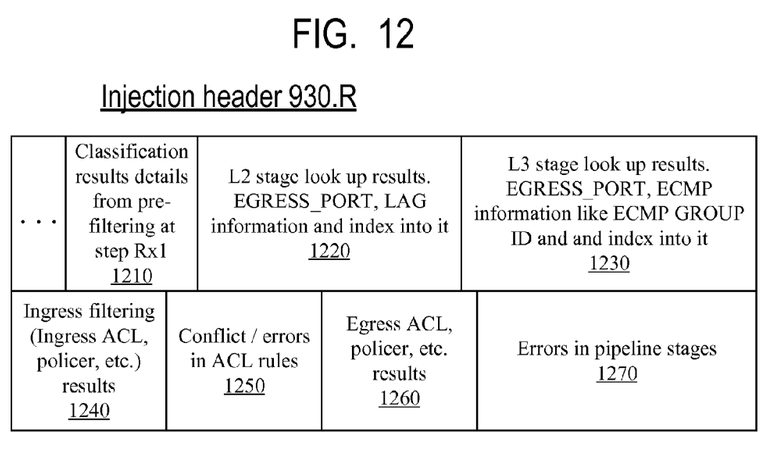

In some embodiments, parameters 930 include an injection header 930.1 (FIG. 11) and a results header 930.R (FIG. 12). Such headers may contain many fields as known in the art, and may also contain the information indicated in FIGS. 11 and 12 to implement some embodiments of the present invention. Other fields may also be present.

In FIG. 11, field 1110 is a "trap to CPU" bit, i.e. a bit indicating that the corresponding packet 310 should be trapped and provided to control processor 924 after processing by module 620. This field is initialized to the "no trap" value by port interface 614 P at step 710 (FIG. 7) for each received packet 310. The "no trap" value indicates that the packet should not be trapped. This field is set to the "trap" value (i.e. to trap the packet) for test packets 310T by control processor 924 at step 750.

Field 1120 specifies the source port 614 on which the packet was received. Field 1130 specifies the VLAN on which the packet was originally transmitted on a LAN segment 904. These fields are set by port interface 614 (FIG. 9) at step 710 (FIG. 7), and more particularly during parsing at step Rx1 described above. These fields can become part of results 806 or response data 810 (FIG. 8).

Other fields may be present, and some of the fields described above may be absent. The invention is not limited to VLANs or other features being described except as defined by the appended claims.

FIG. 12 illustrates one example of a results header 930.R where results 806 can be recorded. In the results header, field 1210 is filled by port interface 614 in the pre-filtering at stage Rx1. This field contains classification results obtained during the pre-filtering at step Tx1.

Field 1220 contains the layer-2 results of the table look-up performed at step Rx2. In particular, this field identifies egress ports 614. If any egress port 614 is part of a LAG, then the field 1220 identifies the LAG and the LAG member (e.g. index into the LAG table) for that egress port.

Field 1230 contains the layer-3 results of the table look-up performed at step Rx2. The layer-3 results may contain layer-3 (e.g. IP) egress ports for the packet, i.e. ports identified by the packet switch's layer-3 interface. A port 614 may be identified by either layer-2 or layer-3 address ("interface") or both. Multiple ports 614 may correspond to a single layer-3 port (e.g. if the ports are part of a LAG). Multiple layer-3 ports may form an ECMP group.

For multicast packets, multiple egress ports can be specified in field 1220 or 1230 or both. For example, some embodiments use multicast RPF (Reverse Path Forwarding). In such embodiments, an RPF check is performed at step Rx2, and if the check is successful then the corresponding egress ports are identified in field 1230. If the check is unsuccessful, then the error is identified in this field.

Further, if any of the egress ports in field 1220 or 1230 is part of an ECMP group of paths, then the field 1230 identifies the ECMP group and the ECMP member corresponding to the egress port.

Field 1240 identifies the results of applying the Ingress ACL (Access Control List) at step Rx3 to the packet. In particular, if the packet transmission is to be blocked on any of the egress ports identified in field 1220 or 1230, these blocked ports are identified in field 1240. This field can also identify the pertinent ACL rules which permit or deny the packet transmission for each egress port. This field can also specify other policy decisions related to security, QoS, and possibly other functions, as determined by applying any policies in effect, such as can be specified in the look up tables and identified at step Rx3. For example, if the QoS rules require the packet to be discarded, field 1240 may indicate this fact and identify the pertinent QoS rule or rules.

Field 1250 identifies any conflicts or errors in the Ingress ACL rules applicable per step Rx3.

Field 1260 identifies the results of applying the Egress ACL (Access Control List) at step Tx3 to the packet. In particular, if the packet transmission is to be blocked on any of the ports identified in field 1220, these blocked ports are identified in field 1260. This field can also identify the pertinent Egress ACL rules that permit or deny the packet transmission for each egress port. This field can also specify other policy decisions related to security, QoS, and possibly other functions, as determined by applying any policies in effect. For example, if the QoS rules require the packet to be discarded, field 1240 may indicate this fact and identify the pertinent QoS rule or rules.

Field 1270 identifies errors, if any, in the pipeline stages Rx1 through Tx5 or possibly other pipeline stages (not shown). Exemplary errors include memory overflow, e.g. overflow of a queue in a pipeline stage.

In some embodiments, a packet can be discarded due to lack of available space in memory 630, or lack of memory allocated for the corresponding receive queue 910 or transmit queue 914. This can also be identified in header 930.R. For example, when a packet must be discarded upon receipt for lack of available space in memory 630, a header 930 may be created and provided to control processor 924 to indicate to the control processor that a packet was received but could not be stored in the memory and had to be discarded due to lack of space.

In some embodiments, the headers 930.1 and 930.R are provided for all received packets 310, not just the special or test packets. Thus, control processor 924 can be informed of pertinent errors for any packet.

The invention is not limited by any particular type of information that can be provided in results header 930.R.

Some embodiments provide a method for packet processing by a packet switch comprising a plurality of ports connected to a network, the packet switch being operable to perform a first processing operation on packets (e.g. operation 760 in FIG. 7). The first processing operation on a packet comprises:
 determining whether or not the packet is to be forwarded or discarded;
 if the packet is to be forwarded, then determining one or more ports on which the packet is to be forwarded, the one or more ports being ports of the packet switch.

The method comprises:

receiving a first packet (e.g. 310) over a network at a port of the packet switch;

detecting, by the packet switch, whether or not the first packet is of a predefined type (such as the special-packet type, i.e. for which a test packet is to be formed);

if the first packet is not of the predefined type, then the packet switch performing the first processing operation on the first packet;

if the first packet is of the predefined type, then:

the packet switch forming a test data structure (e.g. 310T, possibly with 930) which comprises a test packet, the test data structure being formed using a payload of the first packet; and the packet switch performing the first processing operation on the test packet to determine results of the processing operation (e.g. 806), wherein if the first processing operation determines that the test packet is to be forwarded, then the results indicate the one or more ports on which the test packet is to be forwarded as determined by the first processing operation, and if the first processing operation determines that the test packet is to be discarded, then the results indicate that the test packet is to be discarded.

In some embodiments, the packet switch transmits, over the network, a packet carrying data (e.g. 810) obtained from the results of the processing operation on the test packet. For example, the packet can be a response packet 310R or the special packet 310S with response data 810.

In some embodiments, the packet carrying the data obtained from the results of the processing operation is transmitted by the packet switch to an address obtained from the first packet (e.g. the IP source address of the special packet, or obtained from parameters 510).

Some embodiments provide information handling systems with packet switches to implement the methods described above. Some embodiments provide a computer readable medium (e.g. all or part of memory 630 forming part of the switch, or a separate disk or semiconductor memory or some other medium) comprising one or more computer instructions for execution by a control processor according to the present invention.

The invention is not limited to the embodiments described above. Other embodiments and variations are within the scope of the invention, as defined by the appended claims.

What is claimed is:

1. A method for packet processing by a packet switch comprising a plurality of ports connected to a network, the packet switch being operable to perform a first processing operation on packets, wherein the first processing operation on a packet comprises:

determining whether or not the packet is to be forwarded or discarded;

if the packet is to be forwarded, then determining one or more ports on which the packet is to be forwarded, the one or more ports being ports of the packet switch;

wherein the method comprises:

receiving a first packet over a network at a port of the packet switch;

detecting, by the packet switch, whether or not the first packet is of a predefined type;

if the first packet is not of the predefined type, then the packet switch performing the first processing operation on the first packet;

if the first packet is of the predefined type, then:

the packet switch forming a test data structure which comprises a test packet, the test data structure being formed using a payload of the first packet; and the packet switch performing the first processing operation on the test packet to determine results of the processing operation, wherein if the first processing operation determines that the test packet is to be forwarded, then the results indicate the one or more ports on which the test packet is to be forwarded as determined by the first processing operation, and if the first processing operation determines that the test packet is to be discarded, then the results indicate that the test packet is to be discarded.

2. The method of claim 1 further comprising the packet switch transmitting, over the network, a packet carrying data obtained from the results of the processing operation on the test packet.

3. The method of claim 2 wherein the packet carrying the data obtained from the results of the processing operation is transmitted by the packet switch to an address obtained from the first packet.

4. The method of claim 3 wherein the address obtained from the first packet is a source address in the first packet.

5. The method of claim 1 wherein the first processing operation determines that the test packet is to be forwarded, and the method further comprises:

inserting first data obtained from the results into the payload of the first packet; and transmitting the first packet with the first data over the network.

6. The method of claim 5 wherein transmitting the first packet with the first data over the network comprises transmitting the first packet with the first data on the one or more ports determined for the test packet by the first processing operation.

7. The method of claim 1 wherein if the first processing operation determines that the test packet is to be forwarded on a port connected to a network link which is part of a LAG (Link Aggregation Group), then the results identify the LAG.

8. The method of claim 1 wherein if the first processing operation determines that the test packet is to be forwarded on a port connected to a network link which is a member of a LAG (Link Aggregation Group), then the results identify the LAG and an index of the network link, the index being in a table identifying the links which are members of the LAG.

9. The method of claim 1 wherein if the first processing operation determines that the test packet is to be forwarded on a port associated with a path which is a member of an ECMP (Equal Cost Multi Path) group, then the results identify the ECMP group.

10. The method of claim 1 wherein if the first processing operation determines that the test packet is to be forwarded on a port associated with a path which is a member of an ECMP (Equal Cost Multi Path) group, then the results identify the ECMP group and an index of the path, the index being in a table identifying the paths which are members of the ECMP group.

11. An information handling system comprising a packet switch operable to perform the method of claim 1.

12. An information handling system comprising a packet switch comprising:

a plurality of ports each of which is for being connected to at least one network link;

a control processor;

a normal processing module for determining, for each packet received from the ports:

whether or not the packet is to be forwarded through one or more of the ports, and if the packet is to be forwarded, then the normal processing module providing the packet for transmission at each port through which the packet is to be forwarded;

whether or not the packet is to be discarded and not forwarded;

whether or not the packet is to be provided to the control processor, and if the packet is to be provided to the control processor then sending the packet to the control processor;

wherein the plurality of ports, the control processor, and the normal processing module are operable to cooperate to:

recognize a packet received at the plurality of ports as a packet of a predefined type;

for each received packet of the predefined type, form a test data structure comprising a test packet, the test data structure being formed using a payload of the packet of the predefined type; and process the test packet by the normal processing module to provide normal processing results, wherein if the normal processing module determines that the test packet is to be forwarded, then the normal processing results also indicate the one or more ports on which the test packet is to be forwarded as determined by the normal processing module, and if the normal processing module determines that the test packet is to be discarded, then the normal processing results indicate that the test packet is to be discarded.

13. The information handling system of claim 12 wherein the packet switch is further operable to transmit, over the network, a packet carrying data obtained from the normal processing results.

14. The information handling system of claim 13 wherein the packet switch is operable to transmit the packet carrying the data obtained from the normal processing results to an address obtained from the packet of the predefined type.

15. The information handling system of claim 14 wherein the address obtained from the packet of the predefined type is a source address in the packet of the predefined type.

16. The information handling system of claim 12 wherein if the normal processing module determines that the test packet is to be forwarded, then the packet switch is operable to:

insert data obtained from the normal processing results into the payload of the packet of the predefined type; and transmit the packet of the predefined type with the data obtained from the normal processing results over the network.

17. The information handling system of claim 16 wherein transmitting the packet of the predefined type with the data obtained from the normal processing results over the network comprises transmitting the packet of the predefined type with the data obtained from the normal processing results on the one or more ports determined for the test packet in processing the test packet by the normal processing module to provide the normal processing results.

18. The information handling system of claim 12 wherein if the normal processing module determines that the test packet is to be forwarded on a port connected to a network link which is part of a LAG (Link Aggregation Group), then the results identify the LAG.

19. The information handling system of claim 12 wherein if the normal processing module determines that the test packet is to be forwarded on a port connected to a network link which is a member of a LAG (Link Aggregation Group), then the results identify the LAG and an index of the network link, the index being in a table identifying the links which are members of the LAG.

20. The information handling system of claim 12 wherein if the normal processing module determines that the test packet is to be forwarded on a port associated with a path which is a member of an ECMP (Equal Cost Multi Path) group, then the results identify the ECMP group.

21. The information handling system of claim 12 wherein if the first processing operation determines that the test packet is to be forwarded on a port associated with a path which is a member of an ECMP (Equal Cost Multi Path) group, then the results identify the ECMP group and an index of the path, the index being in a table identifying the paths which are members of the ECMP group.

22. A non-transitory computer readable medium comprising one or more computer instructions for execution by a control processor of a packet switch, wherein execution of the one or more computer instructions causes the control processor to perform operations of:

obtaining packets of a predefined type when such packets are received over the network by the packet switch;

for each packet of the predefined type:

(a) forming a test data structure comprising a test packet, the test data structure being constructed using a payload of the packet of the predefined type;

(b) causing the packet switch to perform a processing operation on the test packet as if the test packet was received by the packet switch over the network and not formed by the control processor, wherein the processing operation determines, for any packet:

whether or not the packet is to be forwarded or discarded;

if the packet is to be forwarded, then determines one or more ports on which the packet is to be forwarded, the one or more ports being ports of the packet switch;

(c) receiving results of the processing operation on the test packet, the results indicating:

whether or not the test packet is to be forwarded or discarded;

if the test packet is to be forwarded, then the results indicating one or more ports on which the test packet is to be forwarded, the one or more ports being ports of the packet switch.

23. The non-transitory computer readable medium of claim 22 wherein the one or more computer instructions enable the control processor, in operation (c), to perform at least one of the following operations:

(c1) modify the packet of the predefined type to contain data obtained from the results of the processing operation, and provide the modified packet of the predefined type for transmission by the packet switch;

(c2) form a response packet with data obtained from the results of the processing operation, and provide the response packet for transmission by the packet switch.

24. The non-transitory, computer readable medium of claim 23 wherein the one or more computer instructions enable the control processor, in operation (c), to perform the operation (c1) in which, if the results indicate that the test packet is to be forwarded, then the modified packet is provided for transmission on the one or more ports determined for the test packet.

25. The non-transitory computer readable medium of claim 23 wherein the one or more computer instructions enable the control processor, in operation (c), to perform the operation (c2) in which the response packet is provided for transmission to a source address of the packet of the predefined type.

* * * * *